United States Patent [19]
Harada

[11] Patent Number: 4,926,380
[45] Date of Patent: May 15, 1990

[54] ULTRASONIC IMAGING APPARATUS
[75] Inventor: Hideo Harada, Nishinasunomachi, Japan
[73] Assignee: Kabushiki Kaisha Toshiba, Kawasaki, Japan
[21] Appl. No.: 285,665
[22] Filed: Dec. 16, 1988
[30] Foreign Application Priority Data Dec. 17, 1987 [JP] Japan ................. 62-317552

[51] Int. Cl.$^5$ .............................. G03B 42/06
[52] U.S. Cl. ........................... 367/7; 367/903
[58] Field of Search ............... 367/903, 105, 7; 128/660.01; 73/626, 609, 610, 628; 381/55

[56] References Cited
U.S. PATENT DOCUMENTS 3,757,288  9/1973  Morin .
3,909,772  9/1975  Miller, III et al. ............ 367/87
4,449,068  5/1984  Johnson et al. .............. 367/135

FOREIGN PATENT DOCUMENTS 0116979   8/1984  European Pat. Off. .
0226466   6/1987  European Pat. Off. .
2502818   8/1975  Fed. Rep. of Germany .
3003317   8/1981  Fed. Rep. of Germany .
3419256  12/1984  Fed. Rep. of Germany .
3618222  12/1987  Fed. Rep. of Germany .

OTHER PUBLICATIONS

H. Meinke, F. W. Gundlach: "Taschenbuch der Hochfrequenztechnik", 3rd edition, 1968, Springer-Verlag, p. 996.

Primary Examiner—Thomas H. Tarcza
Assistant Examiner—Daniel T. Pihulic
Attorney, Agent, or Firm—Oblon, Spivak, McClelland, Maier & Neustadt

[57] ABSTRACT

An ultrasonic imaging apparatus comprises an ultrasonic probe, a transmitter/receiver circuit for driving the ultrasonic probe to emit an ultrasonic beam and processing an echo signal output from the ultrasonic probe and junction unit coupled between the ultrasonic probe and the transmitter/receiver circuit and including an impedance transforming circuit having a high input impedance and a low output impedance for taking in an echo signal output from the ultrasonic probe at high impedance and outputting the taken-in echo signal at low impedance.

10 Claims, 3 Drawing Sheets

ULTRASONIC IMAGING APPARATUS

BACKGROUND OF THE INVENTION

1. Field of the Invention

The present invention relates to an ultrasonic imaging apparatus for directing an ultrasonic beam to a subject under examination, converting an echo wave from the subject to an electric signal, or an echo signal, and processing the echo signal for displaying an image.

2. Description of the Related Art

In a conventional ultrasonic imaging apparatus, an ultrasonic probe having a transducer adapted to transmit and receive ultrasonic waves and a transmitter/receiver circuit for producing a transmission signal (also referred to as a driving pulse or a exciting pulse) and processing a received signal (an echo signal) from the transducer are coupled by means of a cable (conductive wire).

Since the transducer of the ultrasonic imaging apparatus operates to receive an ultrasonic reflected wave and convert it to an electric signal in a receive mode, the transducer can be regarded as a signal source when viewed from the body of apparatus. According to a general principle of the voltage transfer, lower output impedance of the signal source is better from the standpoint of signal loss. However, the output impedance of the transducer is relatively high and the received signal tends to attenuate due to the impedance of the conductive wire and the transmitter/receiver circuit, particularly parallel electrostatic capacitance. The amount of attenuation depends on the ratio of the impedance of the signal source to the impedance of the transmitter/receiver circuit.

Assume that the voltage of the signal source is V1, the impedance C of the cable and the transmitter/receiver circuit is C=Cp // Cc // Ctr and inductance L is null. Then a voltage V2 of the received signal will be given by $$V2 = \{Rtp/(Rp + Rtr + j\omega C \cdot Rp \cdot Rtr)\} \times V1 \qquad (1)$$

where Cp is the electrostatic capacitance of the ultrasonic probe, Cc is the electrostatic capacitance of the cable, Ctr is the electrostatic capacitance of the body of the apparatus, Rp is the resistance of the probe, and Rtr is the resistance of the body of the apparatus. From equation (1) it will be understood that the larger the values of C, ω, the lower the voltage V2 of the received signal. The equation also reveals that the higher the signal frequency used in the apparatus, the larger the amount of attenuation of the received signal.

For this reason, the following measures have conventionally be attempted against the attenuation of the received signal:

(1) To connect inductance L in parallel with the electrostatic capacitance C of the conductive wire and the transmitter/receiver circuit so as to cause parallel resonance at about the transducer center frequency of fo=1/(2πLC). This will not cause the signal attenuation at about the resonance frequency.

(2) To connect an impedance transformer between the transducer and the conductive wire so as to increase the impedance seen at the transducer to the conductive wire and the transmitter/receiver circuit. This will decrease the signal attenuation.

(3) To decrease the electrostatic capacitance of the conductive wire and the transmitter/receiver circuit.

(4) To decrease the impedance of the transducer.

However, the above measures have the following problems.

In the case of measure (4), since the impedance of the transducer is determined by its physical size and material, the impedance cannot be set to a desired value. In the case of measure (3), since the electrostatic capacitance tends to increase because of the complication of the transmitter/receiver circuit due to its multichannel and high performance and the high-density version of the transmitter/receiver circuit due to its complication, it is difficult to decrease the electrostatic capacitance. Measure (2) is effective for a newly developed probe which is large in size. The measure cannot be applied to existing ultrasonic probes. Measure (1) is effective for use with an apparatus in which the electrostatic capacitance is determined, but cannot be used in common with another apparatus with different electrostatic capacitance because the value of the inductance L must be altered. Moreover, the value of the inductance L must be set for each channel, when each of channels has different electrostatic capacitance. Particularly when the electrostatic capacitance becomes large, the value of inductance L must be made small, in which case the Q value (sharpness) will become large and thus the effective frequency range will become narrow. AS a result, a sufficient signal will not be obtained.

SUMMARY OF THE INVENTION

It is accordingly an object of the present invention to provide an ultrasonic imaging apparatus which can decrease the attenuation of a received signal from an ultrasonic probe and can share the already used ultrasonic probe without modification with other ultrasonic imaging apparatus.

According to the present invention, an ultrasonic imaging apparatus comprising an ultrasonic probe having a transducer for transmitting and receiving ultrasonic waves and a cable provided with a connector, and a transmitter/receiver circuit provided in a main body of the apparatus for applying a drive signal to the ultrasonic probe and receiving a received signal based on the transmitted ultrasonic wave is characterized by provision, in a path between the cable and the transmitter/receiver circuit, of transmission signal passage means for permitting the passage of a transmission signal adapted to drive the transducer at low loss and impedance transforming means for taking in the received signal from the transducer at high impedance and outputting the taken-in received signal at low impedance.

In the present invention, the transmission signal for driving the transducer of the ultrasonic probe is applied to the transducer at low loss, the received signal from the transducer is taken in at high impedance, and the taken-in received signal is output to the transmitter/receiver circuit at low impedance.

DESCRIPTION OF THE PREFERRED EMBODIMENTS

Figure 1:
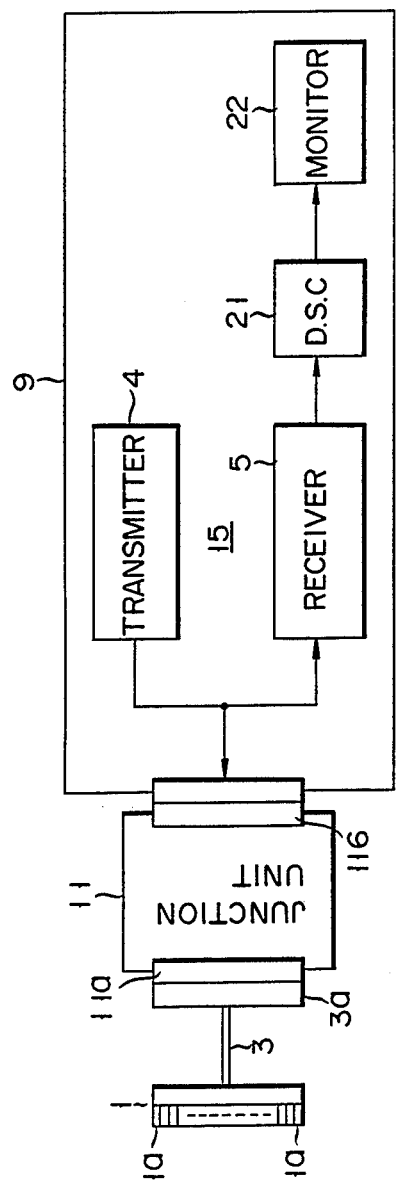
FIG. 1 is a block diagram of an ultrasonic imaging apparatus according to an embodiment of the present invention.

Referring now to FIG. 1, an ultrasonic probe 1 is formed of an array of a number of transducers 1a and connected to a connector 3a via a cable 3. Connector 3a is provided with plural connecting plugs for removable connection to a connector 11a of a junction unit 11. Connector 11a of junction unit 11 is provided with plural connecting sockets which are connected to the connecting plugs of connector 3a. A connector 11b of junction unit 11 is removably connected to a connector 9a attached to a body 9 of an ultrasonic imaging apparatus.

As well known, the ultrasonic imaging apparatus comprises a transmitter/receiver circuit 15 having a transmitter 4 and receiver 5, a digital scan converter (DSC) 21 and a TV monitor 22.

Figure 2:
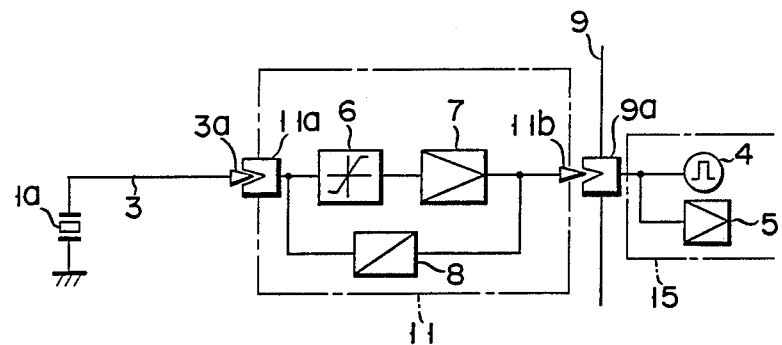
FIG. 2 is a block diagram of an ultrasonic imaging apparatus associated with one ultrasonic transducer.

As shown in FIG. 2, each transducer 1a of ultrasonic probe 1 is connected to an end of cable 3 the other end of which is connected to connector (plug) 3. Connector 3 is removably connected to connector (socket) 11a of junction unit 11.

Junction unit 11 incorporates a high-voltage limiter 6, an impedance transformer 7 and a transmission-pulse passing circuit 8 serving as transmission-signal passing means. Connecting socket 11a of junction unit 11 is connected to connecting plug 3a for the ultrasonic probe and connecting plug 11b is connected to connecting socket 9a of the apparatus body. Thus, ultrasonic probe 1 and apparatus body 9 are connected to each other by means of junction unit 11.

When the standard for connector 3a of ultrasonic probe 1 is not in accord with that for connector 9a of the apparatus body 9, an interchangeable connector may be used for junction unit 11.

High-voltage limiter 6 sends the received signal to succeeding impedance transformer 7 while preserving the received signal at amplitudes less than a predetermined level. Impedance transformer 7 has a function to receive the received signal at high impedance and transmits it at low impedance.

Transmission signal passing circuit 8 serving as transmission signal passing means is provided to correspond to transducer 1a and has a function to permit a transmission signal (driving pulse) adapted to drive transducer 1a to pass at low loss. In this case, a positive rectangular driving pulse is supplied to the transducer.

Figure 3:
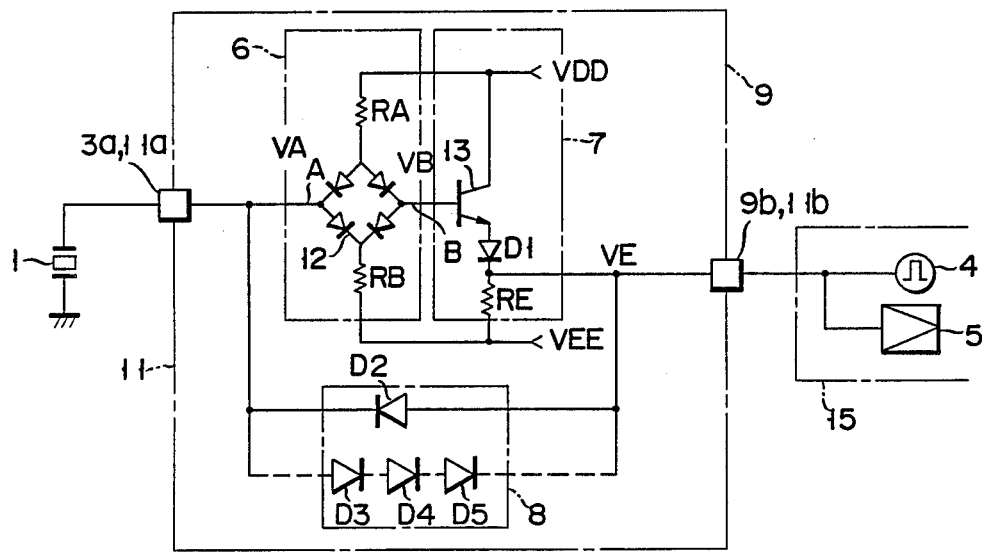
FIG. 3 is a detailed circuit diagram of the ultrasonic imaging apparatus of FIG. 2.

High-voltage limiter 6 is comprised of a diode bridge circuit 12 and resistors RA and RB as shown in FIG. 3. Impedance transformer 7 is formed of an emitter follower comprised of a transistor 13, a diode D1 and a resistor RE. Transmission signal passing circuit 8 is formed of a diode D2 and a series combination of diodes D3, D4 and D5.

With the circuit arrangement of FIG. 3, the received signal (received echo) from transducer 1a is transmitted via diode bridge circuit 12 forming high-voltage limiter 6 to the base of transistor 13, and an emitter output signal of transistor 13 is transmitted via diode D1 to transmitter/receiver circuit 12 of apparatus 9. On the other hand, the transmission signal is applied to transducer 1a via diode D2 or diodes D3, D4, D5. Resistor RE connected to diode D1 is provided for allowing an emitter current to flow through transistor 13.

The operation of the above apparatus will be described hereinafter.

In a transmission mode, when a positive rectangular driving pulse output from transmitter circuit 4, specifically a pulser, in main body 9 of the apparatus rises, it is transmitted to transducer 1a via diode D2, while when it falls, it is passed through diodes D3, D4, D5 forming transmission signal passing circuit 8. At this time, oppositely poled diode D1 and diode bridge circuit 12 are rendered nonconductive, and thus the driving pulse is not applied to impedance transformer 7. By being supplied with the driving pulse, transducer 1a is permitted to emit an ultrasonic beam.

In the above transmission mode, if the driving pulse is of positive polarity, the driving pulse passes through diode D2 in the forward direction thereof, while, if the driving pulse is of negative polarity, the driving pulse passes through diodes D3, D4, D5. Therefore, the loss of the driving pulse (transmission signal) is extremely small.

In a receiving mode, a reflected wave (echo wave) based on the ultrasonic beam transmitted by transducer 1a is received by transducer 1a for conversion to an echo signal. The echo signal is received by high-voltage limiter 6 and impedance transformer 7. In FIG. 3, when diode bridge 12 is balanced and the positive supply voltage (VDD) and the negative supply voltage (VEE) are made equal to each other, namely VDD=−VEE, voltage VA at point A, voltage VB at point B, VDD and VEE are related as follows:

$$VA = VB = (VDD + VEE)/2 = 0 \text{ volt} \qquad (2)$$

Hence an output voltage VE of the emitter follower is given by $$VE = VA - (VBE + VF) = -1.4 \text{ volts}$$

where VBE is the base-to-emitter voltage of transistor 13 and VF is the forward voltage drop of diode D1. This shows that diode D2 is reverse-biased and is thus placed in the OFF state.

Therefore, during a period of time when no driving pulse is applied to transducer 1a, transistor 13 operates as the emitter follower and has an emitter current varying with the received signal. The emitter follower (common-collector circuit) makes features of being capable of raising the input impedance (several tens of kiloohms or more) and lowering the output impedance.

An output voltage VE output from the emitter follower, or an echo signal is applied to receiver 5 via connectors 11b and 9a. The echo signal is processed by receiver 5 to be output therefrom as a B mode signal, for example. The B mode signal is converted to a TV signal by a digital scan converter 21. The TV signal is applied to a TV monitor 22 to display a B mode image corresponding to the B mode signal.

Figure 4:
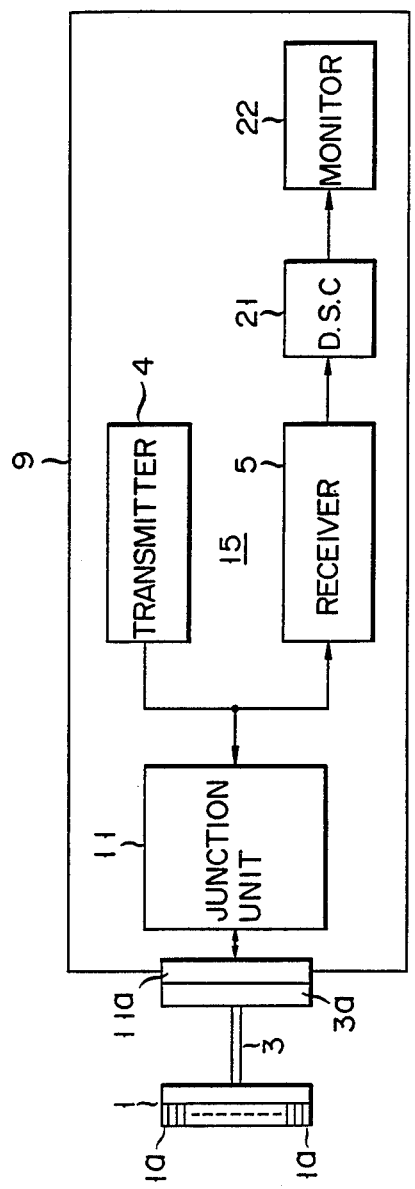
FIG. 4 is a block diagram of an ultrasonic imaging apparatus according to another embodiment of the present invention.

In the above embodiment, junction unit 11 is removably coupled between probe 1 and main body 9 of the ultrasonic imaging apparatus. According to an embodiment of FIG. 4, on the other hand, junction unit 11 is provided within main body 9 of the ultrasonic imaging apparatus. Such an arrangement will provide the same advantage as the previous embodiment.

As described above, if the present invention is applied to an ultrasonic apparatus having a circuit in which a capacitor component of large capacity is included, the attenuation of a signal received from an ultrasonic probe can be reduced at a minimum value and an already used ultrasonic probe can be shared among ultrasonic imaging apparatuses without its modification.

What is claimed is:

1. An ultrasonic imaging apparatus comprising:
   ultrasonic probe means for directing an ultrasonic beam to a subject under examination, receiving an ultrasonic reflected wave from the subject and converting it into an echo signal;
   transmitter/receiver circuit means coupled to said ultrasonic probe means for providing a driving signal to drive said ultrasonic probe means and for processing the echo signal to provide an ultrasonic imaging signal;
   junction means coupled between said ultrasonic probe means and said transmitter/receiver circuit means and including impedance transforming means having a high input impedance and a low output impedance, for taking in the echo signal output from said ultrasonic probe means at high impedance and outputting the taken-in echo signal at low impedance; and
   display means for displaying the ultrasonic imaging signal provided from said transmitter/receiver circuit means as a tomographic image.

2. An ultrasonic imaging apparatus according to claim 1, wherein said impedance transforming means includes an emitter follower circuit connected to receive the echo signal.

3. An ultrasonic imaging apparatus according to claim 1, wherein said junction means includes limiter means followed by said impedance transforming means restricting signal components contained in the echo signal to levels less than a predetermined level.

4. An ultrasonic imaging apparatus according to claim 3, wherein said limiter means includes a diode bridge circuit.

5. An ultrasonic imaging apparatus according to claim 1, wherein said junction means includes drive signal passage means for allowing the passage of the drive signal between said transmitter/receiver circuit means and said ultrasonic probe while suppressing the attenuation of the drive signal.

6. An ultrasonic imaging apparatus according to claim 5, wherein said drive signal passage means includes a diode for forming a signal pass between said ultrasonic probe means and said transmitter/receiver circuit means.

7. An ultrasonic imaging apparatus according to claim 1, wherein said junction means is removably coupled between said ultrasonic probe means and said transmitter/receiver circuit means.

8. An ultrasonic imaging apparatus according to claim 7, wherein said ultrasonic probe means comprises an ultrasonic probe main body, a signal cable coupled to said ultrasonic probe main body and connector means coupled to said signal cable; and wherein said junction means includes connector means removably connected to said connector means of said ultrasonic probe means.

9. An ultrasonic imaging apparatus according to claim 1, wherein said junction means and said transmitter/receiver circuit means are integrated as a body of said ultrasonic imaging apparatus; and wherein said ultrasonic probe means is removably coupled to said junction means of said body of said ultrasonic imaging apparatus.

10. An ultrasonic imaging apparatus comprising:
    ultrasonic probe means having plural ultrasonic transducers for directing an ultrasonic beam to a subject under examination and receiving an ultrasonic reflected wave from the subject to convert it to an echo signal;
    transmitter/receiver circuit means coupled to said ultrasonic probe means for providing a driving signal to drive said ultrasonic probe means and processing the echo signal to provide an ultrasonic imaging signal;
    junction means coupled between said ultrasonic probe means and said transmitter/receiver circuit means and including impedance transforming means having a high input impedance and a low output impedance, for taking in the echo signal output from said ultrasonic probe means at high impedance and outputting the taken-in echo signal at low impedance; and
    display means for displaying the ultrasonic imaging signal provided from said transmitter/receiver circuit means as a tomogram image.

* * * * *